Nov. 14, 1961 B. LUSKIN 3,009,146
LONG RANGE NAVIGATION SYSTEM
Filed Feb. 6, 1958

INVENTOR.
B. Luskin
BY E. R. Evans
Atty.

United States Patent Office 3,009,146
Patented Nov. 14, 1961

3,009,146
LONGE RANGE NAVIGATION SYSTEM
Bernard Luskin, Teaneck, N.J., assignor, by mesne assignments, to Litton Systems, Inc., Beverly Hills, Calif., a corporation of Maryland
Filed Feb. 6, 1958, Ser. No. 713,747
8 Claims. (Cl. 343—112)

The present invention relates to navigation systems for aircraft and the like, and more particularly to a distance-measuring system adapted for such use.

In a preferred form the system according to the invention comprises a radio transmitting station which transmits pulses at a distinctive repetition rate, using a radio frequency carrier suitable for long range reception. The repetition rate is precisely controlled by a frequency standard. On board the aircraft or other remote mobile craft, a constant-speed motor is employed to rotate a numbered wheel at a speed which is synchronized with the repetition rate, and thus directly indicates the distance from the transmitting station, as will be explained.

The invention contemplates an improved arrangement for measuring the time interval of the wave transmission to the receiver. Present day aircraft fly at about 300 miles per hour or more, on the average, and undoubtedly this figure will be doubled in a few years. Therefore, a position fix within about five miles is all that normally would be required by the pilot since that represents only one minute's travel. Assuming the speed of propagation of radio waves to be about 186,000 miles per second, the travel time of the radio waves would have to be measured with a precision of the order of ±25 microseconds. The frequency stability of the time standards used for the measurement is then of the order of 1 part in $10^9$ (one billion) for a 7 hour flight (or 2100 miles at 300 m.p.h., 4200 miles at 600 m.p.h.).

It is the object of the invention to provide a simple and reliable measuring system of the character described, capable of measuring the travel time of the radio waves from the radio transmitter at the known reference location and thus the distance of the receiver on the aircraft from such location with the accuracy mentioned above.

Another object of the invention is to provide a long range navigation system of this character which does not require any adjustment or setting by the pilot during flight and which gives an observer a continuous direct-reading indication of distance from the starting or reference point.

Figure 1:
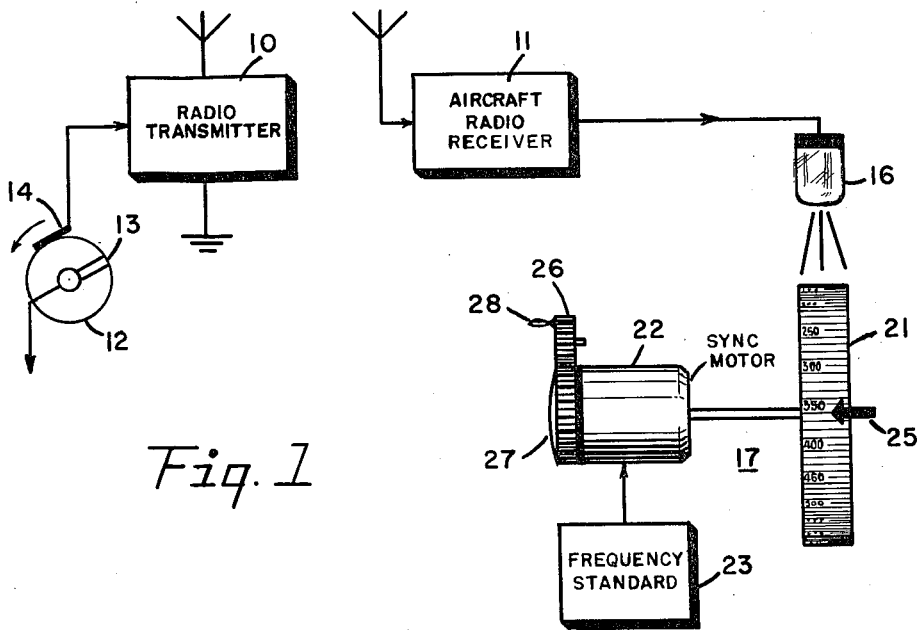
Figure 2:
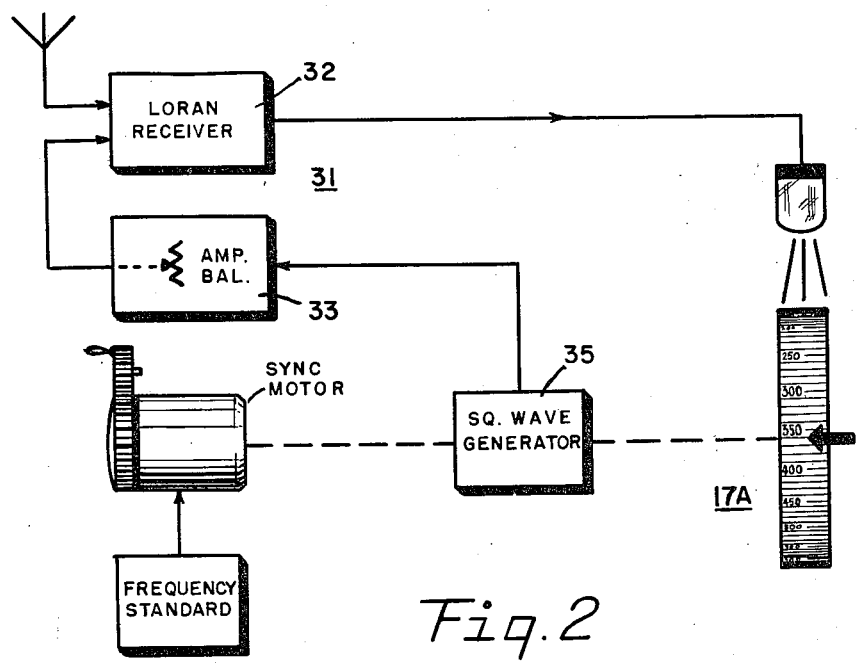

Other objects and advantages of the invention will appear from the following description of the preferred embodiments thereof shown on the accompanying drawings, in which:

FIG. 1 is a view, partly diagrammatic, of the distance measuring system including transmitter, receiver and indicator unit; and FIG. 2 is a similar view of a modification.

In accordance with the invention, a system for measuring and/or indicating the distance beween a fixed reference point and aircraft or the like consists of a transmitter at the fixed reference point radiating pulses at a precisely controlled repetition rate, means on the aircraft for receiving said pulses and converting them into pulses or flashes of light, and a rotating numbered wheel synchronized with the repetition rate of said pulses at the transmitting station and illuminated by the light flashes. Due to the stroboscopic effect of the flashing light, the repetition rate of the transmitter with which the rotating wheel is synchronized causes the wheel to appear stationary. After initial phase adjustment of the wheel and assuming correct spacing of the numbers, the distance from the starting or reference point is indicated continuously during the travel of the aircraft. Even if transmission or reception of the timed pulses is interrupted and then re-established, the correct distance is indicated on the indicator wheel. On a small wheel, the full scale value of the calibration can be several thousand miles or kilometers.

Referring to FIG. 1 of the drawings, a radio transmitter 10, adapted to transmit a series of timed pulses, and a conventional receiver 11, adapted to receive said pulses, are shown. The system is designed to indicate continuously at the receiver the distance between transmitter and receiver; for example, when the transmitter 10 is located at a fixed reference point and the receiver 11 is carried by an aircraft or other mobile unit.

The transmitting station includes means such as a commutator 12, consisting of a rotating segment 13 and a contact brush 14, for controlling the transmission of equally spaced pulses from the transmitter 10. The repetition rate of the transmitted pulses is maintained constant in any suitable manner, as by controlling the rotation of the commutator segment 13 with a high precision frequency standard. Speed-control systems of this kind are well known, being commonly used in the facsimile art and in certain timing instruments. The frequency stability of the standard should be better than 1 part in $10^8$, depending upon the desired system accuracy. A preferred timing standard is the FK-5 temperature-compensated tuning fork manufactured by Times Facsimile Corporation, used with a properly designed drive circuit to eliminate the effects of aging of components, variations in supply voltage, etc.

A plurality of transmitting stations, each with its own characteristic repetition rate, can be operated simultaneously with overlapping signal ranges. Even though the same radio channel is used, the distance indicator operates selectively, as will be explained, depending upon its synchronization with a single one of the transmitters.

The pulses from the transmitter 10, having a repetition rate of $r$ (for example, 24/second), are demodulated and amplified in receiver 11, and impressed upon the gas tube 16 constituting a modulatable light source. The light source or lamp used may, for example, be a type R1130 gas-filled crater lamp manufactured by Sylvania Eelectric Products, Inc. Each pulse of current impressed upon a lamp of this type causes the lamp to emit a short, intense pulse or flash of light.

The distance measuring and/or indicating unit 17 further comprises a rotatable number wheel 21 driven at a precise, predetermined speed by the constant-speed motor 22. In order to synchronize the wheel 21 with the pulse repetition rate of the remote transmitter 10, and maintain exact synchronism for the period during which the system is in operation, the motor 22 is preferably a multiple-pole, variable reluctance synchronous motor adapted to run at a speed corresponding to the output frequency of a frequency standard 23. The frequency standard 23 is preferably a stable audio-frequency fork oscillator of the type described above in connection with the transmitting station, or equivalent. With this arrangement, the number wheel is constrained to rotate exactly in synchronism with the transmitting pulse generator, and for example may make one revolution during the time period between successive pulse signals. When a different transmitting station is involved, having a different pulse repetition rate, the indicator is synchronized with such station by merely changing the frequency of the driving current supplied to the synchronous motor 22.

The operation of the system may be explained as follows: Assuming that the number wheel 21 is synchronized with the pulse repetition rate of the transmitting station as described above and makes exactly one (or more) complete revolutions between pulses when the distance between the stations is fixed, then due to the stroboscopic effect the pulses from transmitter 10 will illuminate an apparently stationary segment of the rotating wheel. Thus a reading can be made from the indicia (reference marks or numbers) on the perihpery of the wheel 21 in relation to the stationary indicator 25. Other pulse repetition rates from other transmitters will occur at random positions of the number wheel and the flashes from the lamp 16 produced by such pulses will not "stop" the wheel, providing the various stations use rates based upon different prime numbers. Obviously, as the mobile receiver moves further away from the transmitter 10, the increased travel time of the radio waves delays the pulse reception and the aspect of the wheel changes under the intermittent illumination by the lamp 16. Thus, the wheel can be calibrated in miles or kilometers and continuously indicates the changing distance between the fixed reference station and the moving aircraft.

In order to set the indicator at the start of the flight, the wheel is set to zero or the known initial distance by any suitable phasing adjustment. As shown, this adjustment is made by turning a pinion 26 which meshes with a gear 27 attached to the stator of the motor 22. An adjusting knob 28 on the pinion 26 may be used to phase the indicator initially, after which no further adjustment or control is required to indicate the position of the aircraft during a flight. When the distance between transmitter and receiver is not changing, the number wheel 21 makes exactly one revolution between successive flashes and the stroboscopic effect makes the wheel appear stationary at one angular position (reading 350 miles as shown). As the distance changes, the wheel will appear to be displaced because of the change in the timing of the flashes and, assuming that the periphery of the wheel is correctly calibrated, the change in distance will be indicated. Even if the signal is cut off or not received for an interval, when the signal reappears, the correct distance will be shown.

Numerous modifications and adaptations of this principle may be made. For example, as shown in FIG. 2, the indicator unit 17a, corresponding to the unit 17 in FIG. 1, may be combined with a loran set 31. This set consists of a conventional loran radio receiver 32 and a cathode ray tube (not shown) having an amplitude balance control 33 used to regulate the amplitude ratio between the received slave and master pulses. The loran receiver differs from an ordinary communications receiver only in that the IF bandwidth is about 80 kc. instead of the usual 5 or 10 kc., so that the pulse information is amplified without distortion. Since the present system requires only one series of pulses, either slave or master, a square-wave generator 35 on the shaft of the drive motor (or otherwise maintained in synchronism) is employed in connection with the amplitude balance control 33 to blank out either the slave or master pulses. In this manner, the conventional loran receiving equipment on the mobile craft may be used to operate the distance indicator as described above in connection with the system shown in FIG. 1.

It will be obvious that the system embodying the invention is simple and reliable from both construction and operating standpoints. While more than one transmitter may be within receiving range of the unit, only the distance to the transmitter having the pulse repetition rate with which it is synchronized will be indicated. A continuous reading of distance is obtained without adjustments during reception of the control pulses and no error is introduced if the reception is interrupted.

Various modifications in the systems and apparatus described will occur to those skilled in the art and may be made without departing from the scope of the invention.

I claim:

1. In a distance measuring system for aircraft and the like, in combination, spaced radio transmitter and receiver units, means including said radio transmitter unit for transmitting equally spaced pulses at a predetermined pulse repetition rate, a light source, means including said receiver unit and light source for converting said pulses into light pulses at a time depending upon the travel time of the radio waves between the spaced transmitter and receiver units, and stroboscopic means including said light source for indicating the distance separating the said radio transmitter and receiver units, said stroboscopic means further including a rotating number wheel bearing indicia on the periphery thereof and means for rotating said wheel at a speed synchronized with said pulse repetition rate.

2. In a distance measuring system for aircraft and the like, in combination, fixed means including a radio transmitter for transmitting pulses at a constant predetermined repetition rate, synchronized pulse detecting means on the aircraft, said pulse detecting means including a rotating member calibrated in units of distance and timed to make an integral number of revolutions between pulses, and means including said rotating member for measuring the travel time of the radio waves from the transmitter to the aircraft.

3. In a distance measuring system for aircraft and the like, in combination, means including a radio transmitter at one reference position for transmitting pulses at a constant predetermined repetition rate, pulse detecting means at a second reference position, indicating means including a rotating member bearing indicia on the periphery thereof representing units of distance for indicating the distance between said reference positions, said indicating means being connected to said pulse detecting means, and means for driving said rotating member at a speed which is synchronized with said pulse repetition rate.

4. A distance measuring system according to claim 3, in which said indicating means includes a lamp for illuminating the indicia on said rotating member and means for flashing said lamp as pulses are received by the pulse detecting means.

5. In a distance measuring system for aircraft and the like, in combination, fixed radio transmitting means for transmitting pulses at a constant repetition rate, means on the aircraft for receiving and amplifying said pulses and stroboscopic means connected to said receiving means for continuously indicating the changing phase displacement of the received pulses as the distance between the transmitting means and receiving means changes due to the travel time of the radio waves.

6. A distance measuring system according to claim 5, in which said stroboscopic means includes a flashing light source connected to said receiving means.

7. A distance measuring system according to claim 6, in which said stroboscopic means includes a rotatable number wheel and means for driving said wheel at a rate bearing a predetermined relation to the constant repetition rate of said pulses.

8. A distance measuring system according to claim 5, in which said receiving means comprises a loran receiver provided with means for blanking out either the slave or master pulses.

References Cited in the file of this patent
UNITED STATES PATENTS

| | | |
|---|---|---|
| 1,495,616 | Simpson | May 27, 1924 |
| 1,562,485 | Affel | Nov. 24, 1925 |
| 1,924,174 | Wolf | Aug. 29, 1933 |
| 2,098,287 | Gent | Nov. 9, 1937 |
| 2,475,598 | Eltz | July 12, 1949 |
| 2,514,677 | Skellett | July 11, 1950 |
| 2,651,033 | Frantz | Sept. 1, 1953 |
| 2,838,753 | O'Brien et al. | June 10, 1958 |